US009722996B1

(12) United States Patent
Kolman et al.

(10) Patent No.: US 9,722,996 B1
(45) Date of Patent: Aug. 1, 2017

(54) PARTIAL PASSWORD-BASED AUTHENTICATION USING PER-REQUEST RISK SCORES

(71) Applicant: EMC Corporation, Hopkinton, MA (US)

(72) Inventors: Eyal Kolman, Tel Aviv (IL); Alon Kaufman, Herut (IL); Ereli Eran, London (GB); Eyal Gruss, Kiryat Ono (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/665,276

(22) Filed: Mar. 23, 2015

(51) Int. Cl.
- *H04L 29/06* (2006.01)
- *G06F 15/16* (2006.01)
- *G06F 17/30* (2006.01)

(52) U.S. Cl.
CPC ................... *H04L 63/083* (2013.01)

(58) Field of Classification Search
CPC .. H04L 63/083; H04L 2463/102; G06Q 20/40
See application file for complete search history.

(56) References Cited

U.S. PATENT DOCUMENTS

| | | | | |
|---|---|---|---|---|
| 7,100,203 B1* | 8/2006 | Tosey | ............... | G06F 21/31 713/167 |
| 2003/0070074 A1* | 4/2003 | Geller | ............... | G06F 21/31 713/168 |
| 2008/0066167 A1* | 3/2008 | Andri | ............... | G06F 21/46 726/5 |
| 2011/0055593 A1* | 3/2011 | Lurey | ............... | G06F 21/31 713/193 |
| 2011/0208964 A1* | 8/2011 | Sama | ............... | G06F 21/31 713/168 |
| 2012/0079570 A1* | 3/2012 | Fu | ............... | H04L 9/3213 726/5 |
| 2012/0222093 A1* | 8/2012 | Badenes | ............... | G06F 21/46 726/4 |

(Continued)

OTHER PUBLICATIONS

Fox, Stuart, "Want to deter hackers? Make your password longer" TechNewsDaily, 2012, 1 page.

(Continued)

*Primary Examiner* — Catherine Thiaw
(74) *Attorney, Agent, or Firm* — BainwoodHuang

(57) ABSTRACT

A system that permits authentication based on a partial password, in which a risk score is assigned to an authentication request, and a minimum partial password size is generated based on the risk score. User-entered password characters are compared to one or more partial passwords having lengths equal to or greater than the minimum partial password size. If a match is found, the user is authenticated. A password similarity threshold for the request may also be generated based on the risk score, indicating a minimum level of similarity required between the user-entered password characters and the characters in a partial password, in order for there to be a match. When the user-entered password characters match a partial password, and the requesting user is authenticated, the system may stop inputting user-entered password characters, and/or transmitting the user-entered password characters to a server computer.

23 Claims, 5 Drawing Sheets

(56) References Cited

U.S. PATENT DOCUMENTS

| | | | | |
|---|---|---|---|---|
| 2013/0333010 A1* | 12/2013 | Chougle | ................ | G06F 21/46 |
| | | | | 726/7 |
| 2014/0215601 A1* | 7/2014 | Rittle | ..................... | G06F 21/36 |
| | | | | 726/16 |
| 2015/0058941 A1* | 2/2015 | Lyman | ................... | H04L 63/08 |
| | | | | 726/6 |
| 2015/0324559 A1* | 11/2015 | Boss | ...................... | H04L 63/20 |
| | | | | 726/1 |
| 2015/0324560 A1* | 11/2015 | Smith | .................. | G06Q 20/20 |
| | | | | 726/19 |

OTHER PUBLICATIONS

Grimes, Roger A. "Password size does matter" InfoWorld, Jul. 21, 2006, 5 pages.

Scarfone, Karen and Souppaya, Murugiah, "Guide to Enterprise Password Management (Draft)" National Institute of Standards and Technology, Special Publication 800-118 (Draft), Apr. 2009, 38 pages.

* cited by examiner

PARTIAL PASSWORD-BASED AUTHENTICATION USING PER-REQUEST RISK SCORES

BACKGROUND

As it is generally known, authentication is the process of determining whether someone or something is, in fact, who or what it is declared to be. In the areas of computer and computer network technology, authentication technologies have most often been based on logon passwords. Existing authentication technologies require users to present their password each time they wish to be authenticated. For example, when accessing a secure resource provided through a computer and/or computer network, an authorized user must first correctly enter (e.g. type) both their username and their complete password into fields within a graphical user interface presented by or on behalf of the secure resource, in order to be authenticated.

Password strength varies depending on the specific password selected by the user. The strength of a given password is a function of its length, complexity, and unpredictability. Most commonly, users select their own passwords. Stronger passwords are more effective in resisting guessing and brute-force attacks, and accordingly lower the overall risk of a security breach. It is therefore highly desirable that users select relatively strong passwords.

SUMMARY

Previous authentication technologies that rely on passwords have exhibited significant shortcomings. While stronger passwords are known to provide better security, they are relatively long and complicated, and accordingly more difficult for users to memorize. As a result, passwords selected by users are often relatively simple, making them easier to memorize, but also making them relatively weak in terms of security. Additionally, users often select the same password for multiple applications, so that they need only memorize a single password. This may result in a cascading security breach, since a compromise of a user's credentials for one application puts the other applications sharing the same password at risk.

Typing stronger passwords is also relatively inconvenient, due to their length and complexity. Moreover, since the user typically cannot see the characters he or she is typing while entering their password, any typos are difficult to detect. The process of selecting and entering passwords in existing systems accordingly runs counter to the use of strong passwords, and the resulting use of weaker passwords has significant negative implications with regard to system security.

In addition, each time a complete password is entered into an existing system there is a risk that it will be intercepted. Such password interceptions may be accomplished by malware (e.g. a "keylogger") executing on the local machine, and/or by malicious computer software and/or hardware that intercepts traffic passing over a network, such as when the complete password is transmitted from a client computer to a server computer.

To address the above described and other shortcomings of previous technologies, a new system is disclosed that authenticates a user based on a partial password. The disclosed system receives an authentication request, an identifier of a user to be authenticated, and risk attributes associated with the authentication request. A risk score is generated for the authentication request based on the risk attributes and the user identifier associated with the authentication request. Relatively higher risk scores are generated for authentication requests associated with risk attributes indicating a higher risk of fraud.

The risk attributes for the authentication request may include various specific measures, quantities, and/or values that may be indicative of whether the user presenting the user identifier and password characters is an imposter. For example, such attributes may include a device identifier of the device from which the user is communicating, a geographic location from which the user is communicating (e.g. determined by Internet Protocol (IP) address to geographic location conversion), a day of the week during which the request is issued, a time of day at which the request is issued, a time duration since a previous authentication request was made for the same user, the internet service provider being used by the user to connect to the Internet, and/or any other risk attribute that may be appropriate for a specific embodiment or configuration.

Based on the risk attributes extracted for the authentication request, the disclosed system generates a risk score to be assigned to the authentication request. The disclosed system may generate a risk score for the authentication request based on how anomalous the risk attributes are. For example, an authentication request may be considered to have a relatively higher risk of fraud if its risk attributes are inconsistent with previous authentication requests for the requesting user. The risk score for the authentication request may further be based on how similar the risk attributes for the authentication request are to known attack patterns.

The risk score may be a probabilistic measure indicating a likelihood of fraud. For example, the risk score may be a value representing the probability that the actual user is not the user identified by a user identifier provided in response to the authentication request, but is instead an imposter. Relatively higher risk scores are generated for authentication requests having a relatively higher risk of fraud, i.e. requests where it is relatively more likely that the actual user entering the username and password is not the user identified by the user identifier received in response to the authentication request.

Other factors may also or alternatively be used when generating a risk score for an authentication request, such as the significance or importance of a secure resource to which access is being requested, and/or the level of access to the resource that would be granted to the user if the user is authenticated.

Based on the risk score generated for the authentication request, the disclosed system generates a minimum partial password size for the authentication request. The minimum partial password size is the minimum number of initial characters from the user's password that may be used to authenticate the user for the current request. The minimum partial password size is less than the length of the complete password for the user identifier, and the disclosed system generates relatively smaller minimum partial password sizes for authentication requests having relatively lower risk scores.

As characters of the password are entered, e.g. by typing into a password field of a form provided in a graphical user interface, the disclosed system monitors the total number of characters that have been entered. When the total number of user-entered password characters reaches the minimum partial password size for the authentication request, the disclosed system compares the user-entered password characters to a partial password associated with the presented user identifier. The partial password has a length equal to the minimum partial password size for the request. If the user-entered password characters match the partial password, the user is authenticated.

In one embodiment, a server computer may generate the minimum partial password size for the authentication request based on the risk score, and a client computer may input the user-entered password characters. The server computer transmits the minimum partial password size for the authentication request to the client computer, and the client computer begins transmitting the user-entered password characters from the client computer to the server computer when a total number of user-entered characters reaches the minimum partial password size for the authentication request.

In another aspect of the disclosed system, the server computer may store multiple partial passwords in association with the user identifier presented in response to the authentication request. Each of the partial passwords associated with the user identifier has a length that is less than a length of a complete password stored in association with the user identifier, i.e. less than the length of the complete password of the legitimate user associated with the user identifier. The server computer retrieves a partial password to be compared with the user-entered password characters from the partial passwords associated with the presented user identifier.

In another aspect of the disclosed system, in response to the user-entered password characters not matching the partial password having a length equal to the minimum partial password length, the disclosed system inputs at least one more user-entered password character, to form a new set of user-entered password characters. The disclosed system then retrieves another partial password from the partial passwords associated with the presented user identifier. The new partial password has a length greater than the minimum partial password size for the authentication request, and equal to the length of the new set of user-entered password characters. The disclosed system then compares the new set of user-entered password characters to the second partial password, and authenticates the user if there is a match. In this way, the disclosed system may be embodied to compare a series of partial passwords, having progressively increasing lengths, to sets of user-input password characters having correspondingly increasing lengths, until a match is found and the user is authenticated, or until the user finishes entering password characters without any match to the partial passwords or to the complete password associated with the presented user identifier.

The partial passwords associated with the user identifier may each be encrypted using an encryption key, such as a cryptographic hash function. In such an embodiment, the client computer may encrypt the user-entered password characters prior to transmitting them from the client computer to the server computer, and the server computer compares the encrypted user-entered password characters to the encrypted versions of the partial passwords.

The disclosed system may further be embodied to retrieve a password similarity threshold for the request based on the risk score assigned to the authentication request. The password similarity threshold indicates a minimum level of similarity that must exist between the user-entered password characters and the characters in a partial password, in order for there to be a match. Relatively lower password similarity thresholds are selected for relatively lower risk scores. In such an embodiment, the disclosed system determines a level of similarity between the user-entered password characters and corresponding characters in the partial password(s), and determines that the user-entered password characters match a partial password only in the event that the level of similarity between the user-entered password characters and the characters in the partial password is at least as high as the password similarity threshold for the authentication request. The password similarity threshold may be any appropriate measure of similarity. For example, the password similarity threshold may be a percentage of matching characters, having a value indicating a minimum percentage of characters that must match between a set of user-entered characters and a partial password in order for the user to be authenticated.

The disclosed system may further be embodied such that a client computer stops inputting the user-entered password characters when the user-entered password characters match the partial password. For example, when the user-entered password characters match the partial password, and the user is accordingly authenticated, the client computer may be immediately redirected to a requested secure resource, prior to the user completely entering their password, and accordingly prior to the user inputting their complete password, and/or prior to transmitting the user's complete password over a network to a server computer.

The disclosed system provides significant advantages over previous technologies. In the disclosed system, most authentication requests for a typical user are assigned a relatively low risk score. This occurs because a typical user tends to be repeatedly authenticated in the same way, e.g. on the same device at the same geographic location, on the same days of the week, during the same times of day, etc. Authentication requests with risk attributes consistent with those established patterns of user behavior are assigned relatively low risk scores, resulting in relatively small minimum partial password sizes (e.g. 2, 3 or 4 characters), and relatively low password similarity thresholds. Under such conditions, the disclosed system requires the user to only type a small number of characters from their password, while also tolerating some relatively high number of typos. A significantly improved user experience is thus provided without a significant decrease in security level. Moreover, the convenience of the disclosed system encourages use of different passwords for different applications, and of longer, and accordingly stronger, passwords, since only a relatively small subset of a password must usually be entered, with some number of typos tolerated. As a result, the security of the overall computer system is improved. In addition, since the user does not typically have to enter their complete password, and accordingly the complete password is less frequently transmitted between the client computer and the server computer, there are fewer opportunities for a malicious program or device to intercept the complete password, either on the local computer, or on a network between the user's client computer and a server computer.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
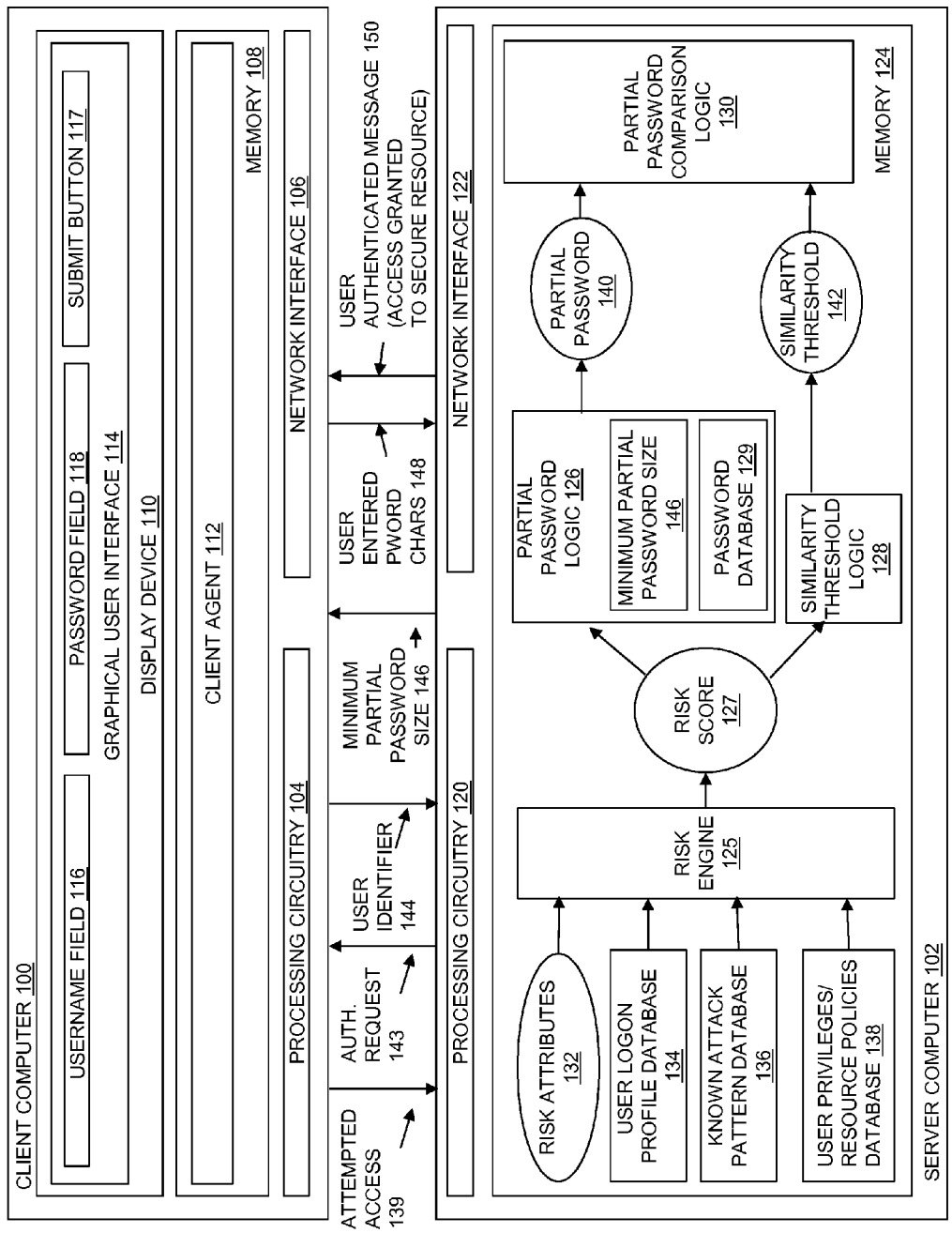
FIG. 1 is a block diagram showing an execution environment including components of an illustrative embodiment of the disclosed system.

As shown in FIG. 1, in an example of an execution environment including components in an illustrative embodiment of the disclosed system, a Client Computer 100 and a Server Computer 102 are communicably coupled together. Client Computer 100 and Server Computer 102 may be communicably coupled through any specific type of communication network and/or computer network that allow computers to exchange data, such as one or more Local Area Networks (LANs), Wireless Local Area Networks (WLANs), Wide Area Networks (WANs), e.g. the Internet, and/or any other specific type of network.

The Client Computer 100 includes a Network Interface 106, Processing Circuitry 104, Memory 108, and a Display Device 110. Display Device 110 may include or consist of any specific type of output device operable to present information in visual form, such as a computer monitor or other type of electronic visual display. Network Interface 106 may, for example, include or consist of one or more network interface cards (NICs) or the like. Processing Circuitry 104 may, for example, include or consist of one or more microprocessors or the like. Memory 108 may, for example, include or consist of any specific type of volatile or non-volatile semiconductor memory or the like that is operable to store programs (sequences of instructions) and/or data (e.g. program state information) for use in the Client Computer 100.

In the Client Computer 100 in the illustrative embodiment of FIG. 1, the Memory 108 stores program code for execution on the Processing Circuitry 104, such as client program code that may be used to access a secure resource. For example, the client program code of the illustrative embodiment shown in FIG. 1 includes Client Agent 112, which, for example, may include or consist of a Web browser or other specific type of client program. The Client Agent 112 may generate and/or have access to a Username Field 116, Password Field 118 and a Submit button 117 displayed within the Graphical User Interface 110, e.g. as part of a user-editable form displayed on Display Device 114.

The Server Computer 102 includes a Network Interface 122, Processing Circuitry 120, and Memory 124. Network Interface 122 may, for example, include or consist of one or more network interface cards (NICs) or the like. Processing Circuitry 120 may, for example, include or consist of one or more microprocessors or the like. Memory 124 may, for example, include or consist of any specific type of volatile or non-volatile semiconductor memory or the like that is operable to store programs (sequences of instructions) and/or data (e.g. program state information) for use in the Server Computer 102.

In the Server Computer 102 in the illustrative embodiment of FIG. 1, the Memory 124 stores program code for execution on the Processing Circuitry 120, such as server program code, including program code for authenticating a user. For example, server program code in the illustrative embodiment of FIG. 1 includes Risk Engine 125, Partial Password Logic 126, Similarity Threshold Logic 128, and Partial Password Comparison Logic 130. The Memory 124 further stores data generated by and/or used during the execution of the server program code, including User Logon Profile Database 134, Known Attack Pattern Database 136, User Privileges/Resource Policies Database 138, and Password Database 129.

During operation of the components shown in FIG. 1, a user of Client Computer 100 causes the Client Agent 112 to attempt to access a secure resource, as shown by Attempted Access 139. The disclosed system may be embodied to perform authentication as part of controlling access to any specific type of secure resource provided by a computer and/or computer network, such as a Web site, online service, application program, confidential or proprietary data, cloud computing resource, computer system, and/or any other type of secure resource for which authentication may be required for access. Attempted Access 139 may, for example, consist of or include one or more HyperText Transfer Protocol (HTTP) messages (e.g. HTTP GET).

In response to the Attempted Access 139, the Server Computer 102 transmits Authentication Request 143 to the Client Computer 100. The Authentication Request 143 may, for example, consist of or include an HTTP 401 Unauthorized response or the like. The Authentication Request 143 may further consist of or include a Hypertext Markup Language (HTML) form that is processed by the Client Agent 112, resulting in the display of the Username Field 116, Password Field 118, and Submit button 117.

The Client Computer 100 transmits a user identifier of the user who is to be authenticated to the Server Computer 102, shown as User Identifier 144. The User Identifier 144 may, for example, consist of or include characters typed into the Username Field 116.

The Risk Engine 125 operates to generate a risk score for the Authentication Request 143, shown as Risk Score 127. The Risk Score 127 is generated based on Risk Attributes 132 and the User Identifier 144. Relatively higher values of Risk Score 127 are generated for authentication requests associated with risk attributes indicating a higher risk of fraud.

The Risk Engine 125 inputs risk attributes associated with the authentication request, shown as Risk Attributes 132. The Risk Attributes 132 may include any relevant measures, quantities, and/or values associated with Authentication Request 143 that may be used to determine a value indicating a probability that the user presenting the User Identifier 144 is an imposter. Examples of Risk Attributes 132 include a device identifier of the device from which the user is communicating (e.g. Client Computer 100), a geographic location from which the user is communicating (e.g. as determined by Internet Protocol (IP) address to geographic location conversion), a day of the week during which the request is issued, a time of day at which the request is issued, a time duration since a previous authentication request was made for the same user, the internet service provider being used by the user to connect to the Internet, and/or any other type of risk attribute that may be appropriate for a specific embodiment or configuration.

The Risk Engine 125 assigns Risk Score 127 to the Authentication Request 143 by generating Risk Score 127 based on the Risk Attributes 132, and passes Risk Score 127 to Partial Password Logic 126 and Similarity Threshold Logic 128. Risk Engine 125 may generate Risk Score 127 based on how anomalous Risk Attributes 132 are with respect to previous successful logon activities of the legitimate user associated with User Identifier 144. For example, Risk Engine 125 may generate Risk Score 127 by comparing one or more of the Risk Attributes 132 to corresponding attribute data and/or statistics in a logon profile associated with User Identifier 144, and stored in User Logon Profile Database 134. For example, Risk Engine 125 may generate a value for Risk Score 127 indicating a relatively higher risk of fraud, if Risk Attributes 132 for Authentication Request 143 are inconsistent with corresponding attributes of previous successful authentications associated with User Identifier 144. Data describing such previous successful authentications for User Identifier 144 may be stored in and accessed from User Logon Profile Database 134. For example, if User Logon Profile Database 134 stores data indicating that previous successful authentications for User Identifier 144 have all been performed from a device having a device identifier that is different from the device identifier of Client Computer 100, then Risk Engine 125 generates a relatively higher value for Risk Score 127 than if User Logon Profile Database 134 indicates that all or a high percentage of previous successful Authentications for User Identifier 144 were performed from Client Computer 100. Similarly, Risk Engine 125 may generate a relatively higher value for Risk Score 127 when other specific risk attributes differ from data describing previous successful authentication requests associated with User Identifier 144. For example, Risk Engine 125 may generate a relatively higher value for Risk Score 127 when i) the geographic location from which the User Identifier 144 is received differs from previous geographic locations from which User Identifier 144 was received, ii) the day of the week during which the request is issued differs from days of the week in which the User Identifier 144 was previously authenticated, iii) the time of day at which the request is issued differs from times of day during which User Identifier 144 was previously authenticated, iv) a time duration since a previous authentication request was made for User Identifier 144 differs from previous time durations between authentications for User Identifier 144, v) the internet service provider being used by the user presenting User Identifier 144 differs from the internet service provider used in previous authentications for User Identifier 144, and/or any under any other conditions where the Risk Attributes 132 are anomalous with regard to data describing previous successful authentications involving User Identifier 144.

Risk Engine 125 may further generate Risk Score 127 based on how similar the Risk Attributes 132 are to known attack patterns in which malicious and/or unauthorized parties or systems attempted to access the secure resource. For example, Risk Engine 125 may generate Risk Score 127 by comparing one or more of the Risk Attributes 132 to corresponding attribute data and/or statistics describing previous malicious attacks, and stored in Known Attack Pattern Database 136. For example, Risk Engine 125 may generate a value for Risk Score 127 indicating a relatively higher risk, if the Risk Attributes 132 for Authentication Request 143 are similar to or consistent with corresponding attributes of previous malicious attacks. Data describing such previous malicious attacks may be stored in, and accessed from, Known Attack Pattern Database 136. For example, Known Attack Pattern Database 136 may include data indicating that one or more previous malicious attacks were performed by multiple users trying to authenticate from a single device over a short period of time. In such a case, if the Risk Attributes 132 indicate that Authentication Request 143 is being issued as part of a series of attempts by multiple users to authenticate from Client Computer 100, and within a similarly short period of time, then Risk Engine 125 may generate a relatively higher value of Risk Score 127.

The value of Risk Score 127 may, for example, be a probabilistic measure, such as a value between zero and one representing a probability that the actual user is not the user associated with the User Identifier 125, but is instead an imposter, with higher values indicating a higher risk. The Risk Engine 125 accordingly generates relatively probability values in Risk Score 217 for authentication requests having a higher risk of fraud, i.e. requests in which Risk Attributes 132 indicate that it is relatively more likely that the actual user presenting the user identifier is not the legitimate user identified by User Identifier 144.

Other factors may also or alternatively be used by Risk Engine 125 when assigning a specific Risk Score 127 to Authentication Request 143. For example, such other factors may include the significance or importance of the secure resource that was the target of Attempted Access 139, and/or a level of access to the secure resource that would be granted to the user if the user is authenticated. For example, if the secure resource to which Attempted Access 139 was directed has a relatively high level of sensitivity (e.g. health care records, personnel files, source code, etc.) Risk Engine 125 may operate to generate a relatively higher value for the Risk Score 127 for Authentication Request 143. Similarly, if an access level that would be granted to the user is relatively high (e.g. including the ability to modify or delete health care records, personnel files, source code, etc.) Risk Engine 125 may also operate to generate a relatively higher value of Risk Score 127 for Authentication Request 143. Such additional information that may be used to assign a Risk Score 127 to Authentication Request 143, including indications of sensitivity levels for secure resources, and/or access levels available to specific users, may be stored within User Privileges/Resource Policies Database 138, for access by Risk Engine 125 when generating a value of Risk Score 127 for Authentication Request 143.

Partial Password Logic 126 receives Risk Score 127 from Risk Engine 125, and uses Risk Score 127 to generate a Minimum Partial Password Size 146 for Authentication Request 143. Minimum Partial Password Size 146 is the minimum number of initial characters from the user's password that may be used to authenticate the user for the current request, i.e. for Authentication Request 143. Minimum Partial Password Size 146 is less than a length of a complete password for the user associated with User Identifier 144. Partial Password Logic 126 generates relatively smaller values for Minimum Partial Password Size 146 for relatively lower values of Risk Score 127. For example, for a relatively low value of Risk Score 127, e.g. a value indicating that a calculated probability of fraud for the authentication request is less than 0.2, Partial Password Logic 126 may generate a relatively low value for Minimum Password Size 146, e.g. 3, thus indicating that the minimum number of initial characters from the user's password that may be used to authenticate the user is 3. In contrast, relatively higher values of Risk Score 127 (i.e. indicating higher probabilities of fraud) cause Partial Password Logic 126 to generate higher values of Minimum Partial Password Size 146, thus requiring more initial characters from the user's password to be used to authenticate the user. As a probability value of Risk Score 127 approaches 1, Partial Password Logic 126 generates values for Minimum Password Size 146 that approach the length of the complete password associated with User Identifier 144. In one embodiment, for a Risk Score 127 of 1, Partial Password Logic 126 generates a value of Minimum Password Size 146 that is equal to the length of the complete password associated with User Identifier 144, so that under such circumstances the user is required to enter their complete password in order to be authenticated. As shown in FIG. 1, the Partial Password Logic 126 generates Minimum Partial Password Size 146, and Server Computer 102 transmits Minimum Partial Password Size 146 to Client Computer 100.

As the user enters characters of their password, e.g. by typing into Password Field 118 in a form displayed by Client Agent 112 within Graphical User Interface 114, the Client Agent 112 monitors the total number of characters that have been entered. When the total number of password characters the user has typed into Password Field 118 reaches Minimum Partial Password Size 146, Client Computer 100 begins transmitting the characters from Password Field 118 to the Server System 102, as shown by User Entered Password Characters 148. For example, if the Minimum Partial Password Size 146 equals 3, then when the number of password characters the user has typed into Password Field 118 reaches 3 (i.e. when the initial three characters of the user's password have been entered), Client Agent 112 transmits those three characters to Server Computer 102 as User Entered Password Characters 148.

On the Server Computer 102, Partial Password Logic 126 uses Minimum Partial Password Size 146 and User Identifier 144 to retrieve Partial Password 140 from Password Database 129. Partial Password Logic 126 initially selects a partial password that is associated with User Identifier 144 and has a length equal to Minimum Partial Password Size 146 from Password Database 129. For example, in the case where Minimum Partial Password Size 146 is 3, Partial Password Logic 126 retrieves a Partial Password 140 from Password Database 129 associated with the User Identifier 144 and having a length of 3 characters.

The Partial Password Comparison Logic 130 compares Partial Password 140 with User-Entered Password Characters 148. If the User-Entered Password Characters 148 match the Partial Password 140, then the user is authenticated, and the Server Computer 102 transmits a message indicating that the user is authenticated to the Client Computer 100, shown in FIG. 1 as User Authenticated Message 150. User Authenticated Message 150 grants immediate access to the secure resource to which Attempted Access 139 was directed. For example, User Authenticated Message 150 may be or include a redirect message that immediately redirects (e.g. navigates) the Client Agent 112 to a Uniform Resource Locator (URL) of the secure resource, and that was originally indicated in the Attempted Access 139. In this way receipt of User Authenticated Message 150 by Client Computer 100 causes the Client Computer 100 to immediately stop inputting the user-entered password characters as a result of User Entered Password Characters 148 matching the Partial Password 140. Access to the requested secure resource is thus provided to the user prior to the user entering their complete password, and accordingly without the Client Computer 100 transmitting the user's complete password to the Server Computer 102.

The disclosed system may further be embodied such that Risk Engine 127 also passes Risk Score 127 to Similarity Threshold Logic 128. Similarity Threshold Logic 128 generates a password similarity threshold for Authentication Request 143 based on Risk Score 127. The similarity threshold for Authentication Request 143 is shown in FIG. 1 as Similarity Threshold 142. Similarity Threshold 142 is a minimum level of similarity that must exist between Partial Password 140 and User Entered Password Characters 148 in order for there to be a match between Partial Password 140 and User Entered Password Characters 148. Similarity Threshold Logic 128 generates relatively lower values for Similarity Threshold 142 for relatively lower values of Risk Score 127. Partial Password Comparison Logic 130 determines a level of similarity between User Entered Password Characters 148 and Partial Password 140, and determines that the User Entered Password Characters 148 match Partial Password 140 only in the event that the level of similarity between User Entered Password Characters 148 and Partial Password 140 is at least as high as Similarity Threshold 142.

Similarity Threshold 142 may be embodied as any appropriate measure of similarity. For example, Similarity Threshold 142 may be a percentage of matching characters, having a value indicating a minimum percentage of characters in User Entered Password Characters 148 that must match corresponding characters in Partial Password 140. For example, in the case of a value of Similarity Threshold 142 indicating that 80 percent of the characters in User Entered Password Characters 148 must match the corresponding characters in Partial Password 140, and where Partial Password 140 has a length of 5, then only if 4 or more characters in User Entered Password Characters 148 match the corresponding characters in Partial Password 140 would Partial Password Comparison Logic 130 determine that User Entered Password Characters 148 match Partial Password 140.

Other similarity metrics may be used as alternatives to a percentage of matching characters. For example, in an alternative embodiment, Similarity Threshold 142 may be a maximum edit distance (e.g. Levenshtein distance) that may exist between User Entered Password Characters 148 and Partial Password 140 in order for there to be a match.

In the event that Partial Password Comparison Logic 130 finds that the User Entered Password Characters 148 do not match Partial Password 140, the disclosed system may further be embodied to compare increasing numbers of user-entered password characters with increasingly large partial passwords. For example, consider the case where the Minimum Partial Password Size 146 is 4, and the Similarity Threshold 142 has a value indicating that 80 percent of the characters must match between the User Entered Password Characters 148 and the Partial Password 140. If there is a single typo within the first four characters typed by the user into Password Field 118, then only 75 percent of the User Entered Password Characters 148 would match the corresponding characters in Partial Password 140. Accordingly, the level of similarity between User Entered Password Characters 148 and Partial Password 140 would be less than Similarity Threshold 142, and the disclosed system would determine that User Entered Password Characters 148 do not match Partial Password 140. In one embodiment of the disclosed system, after the total number of user entered characters reaches the Minimum Partial Password Size 146, the Client Agent 112 continues to transmit progressively larger sets of user entered password characters to the Server Computer 102. Accordingly, in this example, the Client Agent 112 would subsequently transmit a set of 5 characters from the Password Field 118 after the user types the fifth character of their password. In response to the receipt of the increased number of characters in User Entered Password Characters 148 (i.e. a new and larger set of user-entered password characters), the Partial Password Logic 126 retrieves a new Partial Password 140, having a length of 5. The Partial Password Comparison Logic 130 then compares the new set of 5 user-entered password characters received from Client Computer 100 with the new Partial Password 140. If there is still only one typo in the new set of 5 characters, then 4 of the 5 user entered password characters would match the corresponding characters in the new Partial Password 140, resulting in a level of similarity of 80 percent between the new Partial Password 140 and the new set of user-entered password characters received in User Entered Password Characters 148. Accordingly the level of similarity between the new Partial Password 140 and the new set of user-entered password characters would be equal to the Similarity Threshold 142 (80 percent), and the Partial Password Comparison Logic 130 would determine that the new set of user-entered password characters match the new Partial Password 140. In this way the Client Agent 112 may operate by continuing to transmit increasingly large sets of user-entered password characters from the Password Field 118 until a match to one of a plurality partial passwords associated with the user identifier is found, or until the user selects the Submit Button 117, indicating that the complete password has been entered. In response to receipt of each one of the increasingly large sets of user-entered password characters, the Partial Password Logic 126 selects increasingly large partial passwords from Password Database 129, having sizes corresponding to each of the sets of user-entered password characters. The Partial Password Comparison Logic 130 compares new partial passwords retrieved by Partial Password Logic 126 with correspondingly sized sets of the user-entered password characters received in User Entered Password Characters 148. In this way, the disclosed system may be embodied to compare a series of partial passwords, having progressively increasing sizes, to increasing numbers of user-entered password characters, until either a match is found and the user is authenticated, or the user finishes entering password characters (e.g. by clicking on the Submit Button 117) without any match to the partial passwords or to a complete password associated with the User Identifier 144.

Figure 2:
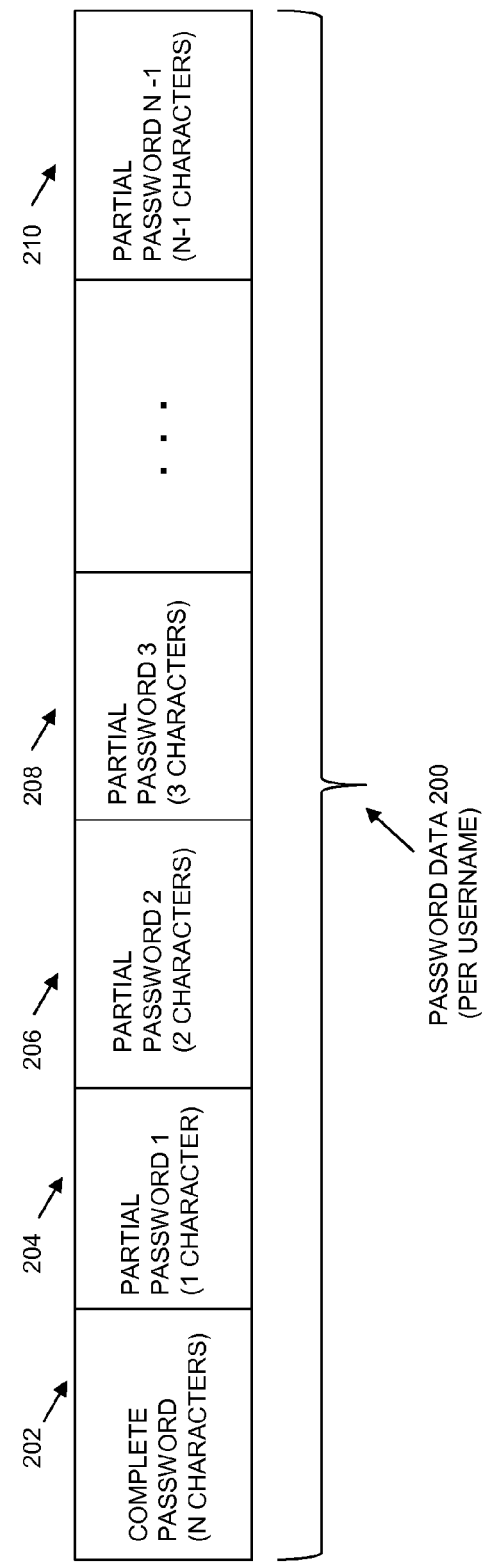
FIG. 2 is a block diagram showing an example of password information stored in an illustrative embodiment of the disclosed system, including a complete password and a number of partial passwords stored in association with a user identifier.

FIG. 2 is a block diagram showing an example of the structure of password information stored in an illustrative embodiment of the disclosed system, including a complete password and a number of partial passwords stored in association with a user identifier. Password Data 200 may be stored in association with a user identifier, such as a username or the like, in Password Database 129 (FIG. 1). The partial password data for a given user identifier may include multiple partial passwords, shown in FIG. 2 by Partial Password 1 204, Partial Password 2 206, Partial Password 3 through Partial Password N−1 210, where N is the character length of a Complete Password 202 associated with the user identifier. In the example of FIG. 2, the partial password data for the associated user identifier includes partial passwords of all possible character lengths from a single character length partial password (Partial Password 1 204), through a partial password having one fewer characters (N−1) than the length N of the Complete Password 202. Alternatively, the set of partial passwords stored for each user identifier may be less than the set of all possible length partial passwords, in order to reduce the amount of storage required to store the partial passwords.

The Complete Password 202, and Partial Passwords 204-210 may each be encrypted using an encryption key, such as a cryptographic hash function. In such an embodiment, the Client Computer 100 may also encrypt the User Entered Password Characters 148 prior to transmitting them from the Client Computer 100 to the Server Computer 102. The Partial Password Comparison Logic 130 in Server Computer 102 then compares the encrypted User Entered Password Characters 148 to the encrypted Partial Password 140 to determine whether there is a match.

Figure 3:
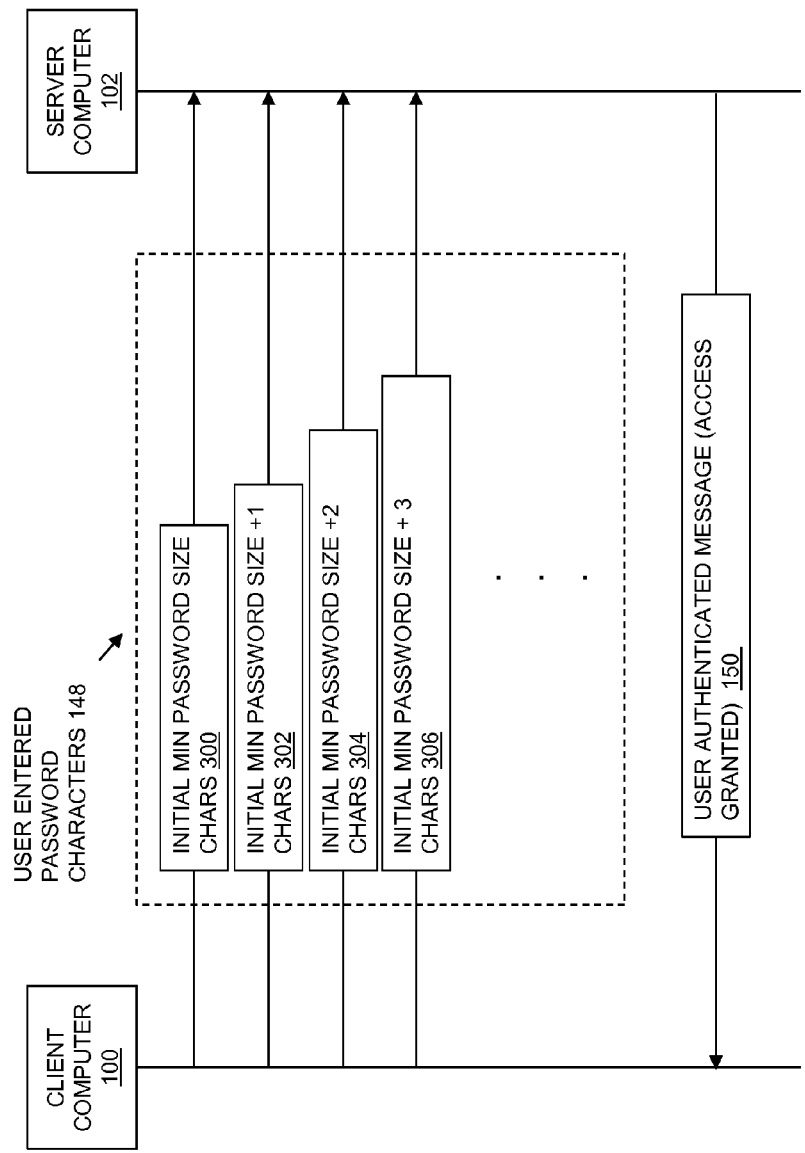
FIG. 3 is a block diagram showing an example of user entered password characters transmitted between a client computer and a server computer in an illustrative embodiment of the disclosed system.

FIG. 3 is a block diagram showing an example of user entered password characters transmitted between a client computer and a server computer in an illustrative embodiment of the disclosed system. As shown in FIG. 3, User Entered Password Characters 148 are transmitted from Client Computer 100 to Server Computer 102. User Entered Password Characters 148 include sequentially transmitted sets of user-entered password characters having increasing lengths, beginning with a set of user entered password characters having a length equal to the minimum password size for the authentication request, shown in FIG. 3 as Initial Minimum Password Size Characters 300. After transmission of Initial Minimum Password Size Characters 300, Client Computer 100 transmits a set of characters having one more character than Initial Minimum Password Size Characters 300, shown in FIG. 3 as Initial Minimum Password Size+1 Characters 302. Client Computer 100 continues transmitting sets of user entered password characters having increasing lengths (e.g. Initial Minimum Password Size+2 Characters 304, Initial Minimum Password Size+3 Characters 306, etc.) until the Client Computer 100 receives a User Authenticated Message 150, or an indication from the user that all password characters have been entered (e.g. the user clicks on the Submit Button 117). Upon receipt of User Authenticated Message 150, Client Computer 100 immediately stops transmitting User Entered Password Characters 148, even if the user has not yet submitted all the characters of their password, for example, as a result of User Authenticated Message 150 redirecting Client Agent 112 to a previously requested secure resource.

Figure 4:
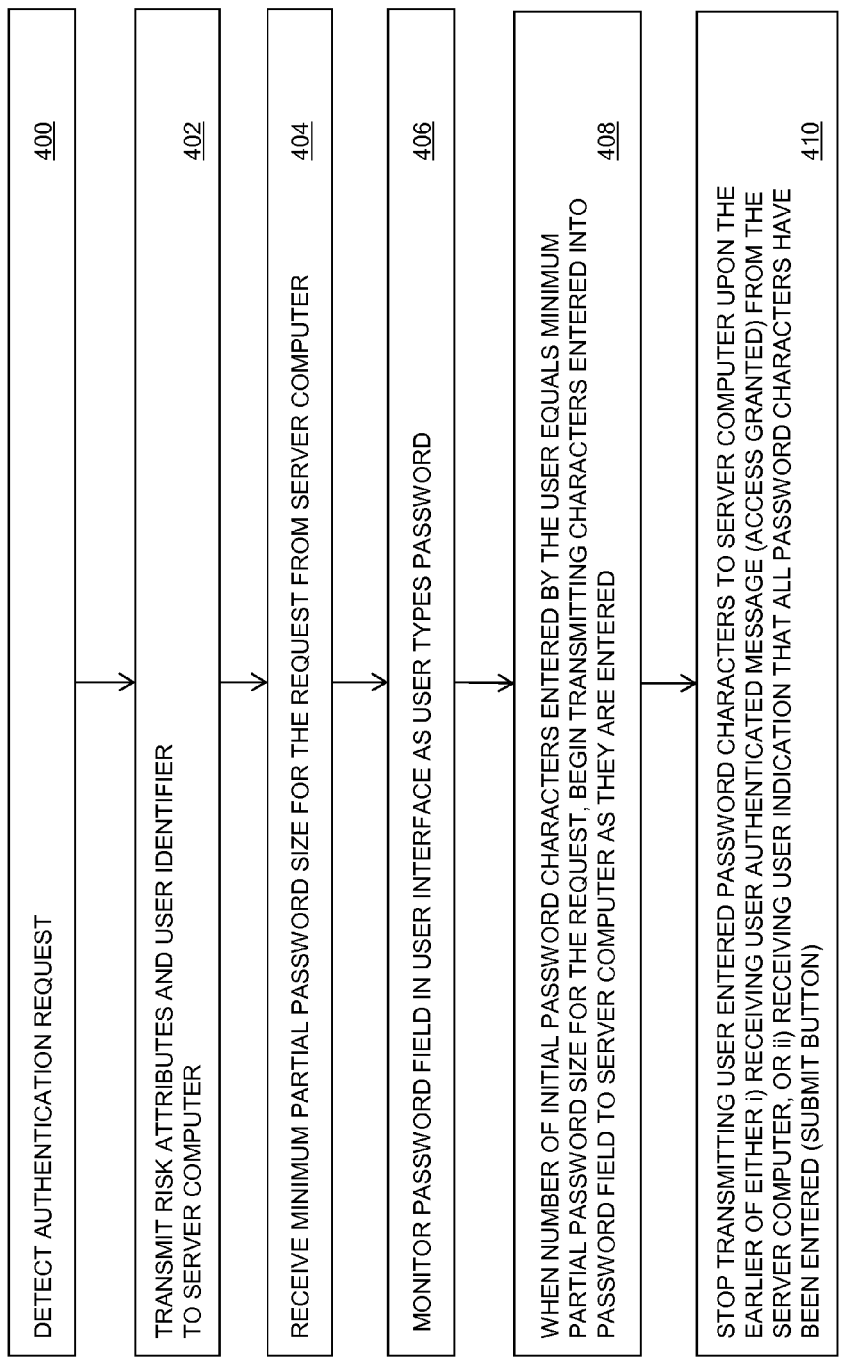
FIG. 4 is a flow chart showing an example of steps performed by a client computer in an illustrative embodiment of the disclosed system.

FIG. 4 is a flow chart showing an example of steps performed by a client computer in an illustrative embodiment of the disclosed system. The steps of FIG. 4 may, for example, be performed by the Client Computer 100 shown in FIG. 1. As shown in FIG. 4, at step 400, the client computer detects an authentication request, such as an HTTP 401 Unauthorized response to a previous access request directed to a secure resource. At step 402, the client computer transmits any risk attributes that may be relevant to determining a risk of fraud associated with the authentication request, and a user identifier of the user to be authenticated, to the server computer. At step 404, the client computer receives, from the server computer, a minimum partial password size for the authentication request received at step 400.

The client computer monitors user entered password characters at step 406, for example as a user types their password into a password field in a user interface of the client computer. The client computer keeps track of the total number of password characters that have been entered as they are typed by the user. At step 408, when the total number of password characters entered by the user reaches the minimum password size for the authentication request, the client computer begins transmitting the user entered characters to the server computer. Accordingly, the client computer initially sends a set of user entered password characters having a length equal to the minimum partial password size for the request, and then continues transmitting subsequently entered password characters as they are typed, e.g. within increasingly large sets of characters received from the password field. The client computer continues transmitting user entered password characters to the server computer until at 410 the client computer either i) receives a user authenticated message from the server computer indicating that the user has been authenticated and granting access to the previously requested secure resource, or ii) receives an indication from the user that all password characters have been entered, as when the user clicks on a submit button, presses the return key, etc.

Figure 5:
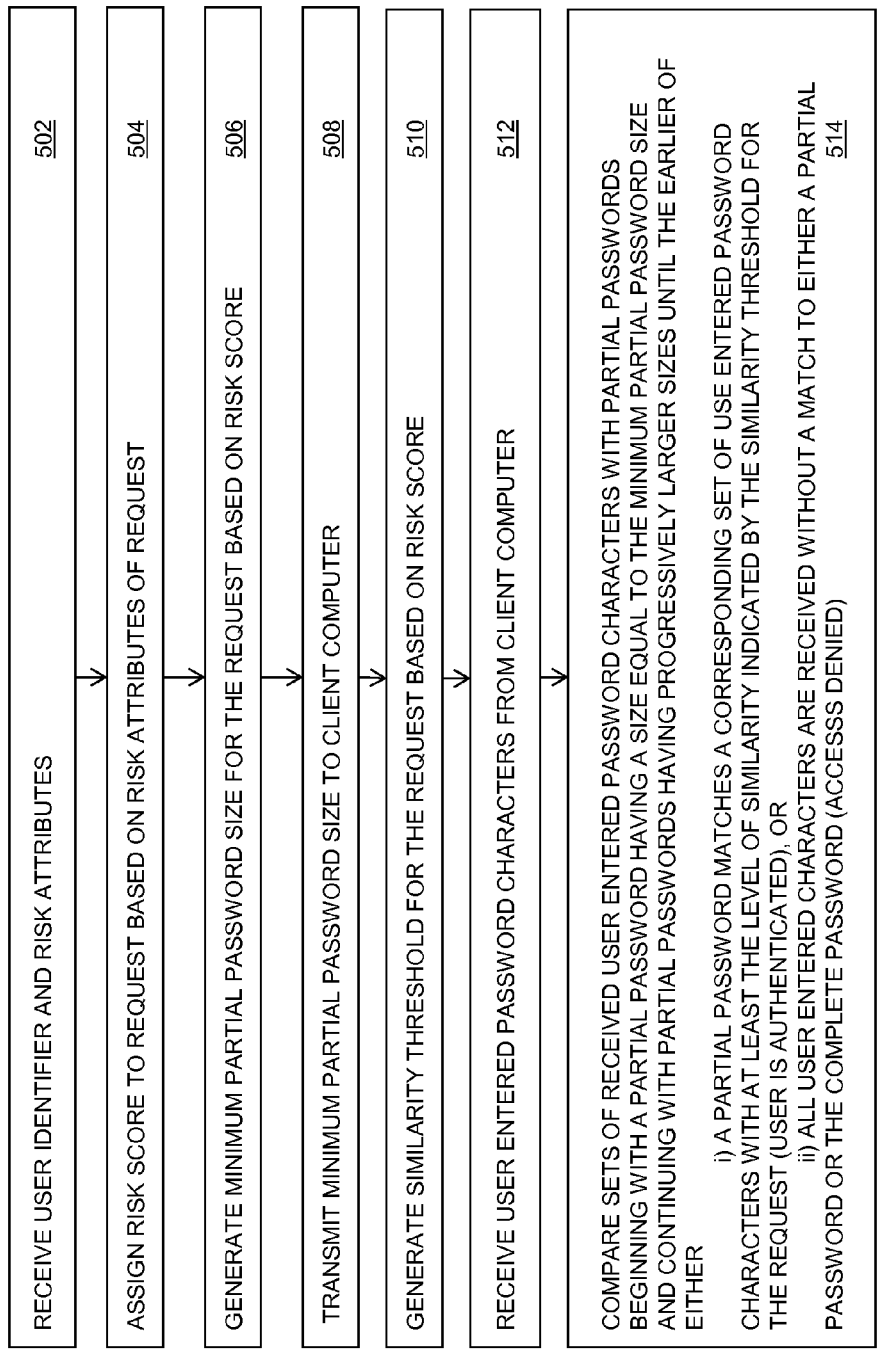
FIG. 5 is a flow chart showing an example of steps performed by a server computer in an illustrative embodiment of the disclosed system.

FIG. 5 is a flow chart showing an example of steps performed by a server computer in an illustrative embodiment of the disclosed system. The steps of FIG. 5 may, for example, be performed by the Server Computer 102 shown in FIG. 1. As shown in FIG. 5, at step 502 the server computer receives (e.g. from a client computer) a user identifier of a user to be authenticated in accordance with an authentication request, and risk attributes relevant to generating a risk score for the authentication request. At step 504 the server computer generates a risk score based on the risk attributes received at step 502, and assigns the risk score to the authentication request. Relatively higher risk scores are generated for authentication requests associated with risk attributes indicating a higher risk of fraud.

At step 506 the server computer generates a minimum partial password size for the authentication request based on the risk score for the authentication request, and at step 508 the server computer transmits the minimum partial password size to the client computer.

At step 510 the server computer generates a similarity threshold for the authentication request, where the similarity threshold represents a minimum level of similarity that must exist between user entered password characters and a partial password in order for a determination to be made that the user entered password characters match the partial password. At step 512 the server computer receives user entered password characters, e.g. from a client computer. The server computer compares sets of received user entered password characters with partial passwords at step 514. The server computer initially compares a set of received user entered password characters with a partial password having a length equal to the minimum partial password size, and may continue to compare increasingly large received sets of user entered password characters with increasingly large partial passwords until the earlier of i) a partial password matches the user entered password characters with a at least a level of similarity as indicated by the similarity threshold for the authentication request generated at step 510, in which case the user is authenticated, or ii) all user entered password characters are received without any match to a partial password or the complete password associated with the user identifier received at step 502, in which case the user is denied access to the secure resource.

Those skilled in the art will recognize that the disclosed system is significantly more than merely the abstract idea of authenticating a user based on a password. Instead, the disclosed system addresses various specific shortcomings arising in previous technical solutions, including shortcomings arising from the requirement of complete passwords. Because most authentication requests for a typical user are likely to be assigned a relatively low risk score, a typical user usually only needs to type in some small number of characters from their complete password in order to be authenticated. In this way the disclosed system leverages the fact that a typical user tends to be repeatedly authenticated in the same way, e.g. on the same device at the same geographic location, on the same days of the week, during the same times of day, etc. For authentication requests having risk attributes consistent with established patterns of user behavior, the disclosed system generates relatively low risk scores, resulting in relatively small minimum partial password sizes (e.g. 2, 3 or 4 characters), and relatively low password similarity thresholds. Under such conditions, the user is only required to type a small number of characters from their password, and some relatively high number of typos are ignored. The disclosed system encourages use of different passwords for different applications, and of longer, and accordingly stronger, passwords, since only a relatively small subset of a complete password must usually be entered. As a result, overall system security is improved. In addition, since the user does not typically have to enter their complete password, and the complete password is therefore less frequently transmitted between the client computer and the server computer, there are fewer opportunities for a malicious program or device to intercept the complete password, either on the local computer, or on a network between the user's client computer and a server computer.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. In particular, while the above description includes a client-server embodiment, the disclosed system is not limited to a client-server configuration, and may alternatively be embodied within a single computer system.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of authenticating a user based on a partial password, comprising executing, on at least one processor, the steps of:
   receiving, from a client computer by a network interface of a server computer, a user identifier and risk attributes associated with an authentication request;
   generating a risk score for the authentication request based on the risk attributes and the user identifier, wherein relatively higher risk scores are generated for authentication requests associated with risk attributes indicating a higher risk of fraud;
   generating, based on the risk score for the authentication request, a minimum partial password size for the authentication request, wherein the minimum partial password size is less than a length of a complete password associated with the user identifier, and wherein relatively smaller minimum partial password sizes are generated for relatively lower risk scores;
   receiving a set of user-entered password characters, wherein the set of user-entered password characters has a length equal to the minimum partial password size;
   comparing the set of user-entered password characters to a partial password stored in association with the user identifier, the partial password having a length equal to the minimum partial password size; and
   in response to the set of user-entered password characters matching the partial password, generating and transmitting a message, from the network interface of the server computer to the client computer, the message indicating that the user is completely authenticated and immediately granting the user full and complete access to a requested secure resource without receipt of the complete password associated with the user identifier by the server computer, and wherein receipt of the message by the client computer causes the client computer to immediately stop inputting user entered password characters prior to the user entering the complete password.

2. The method of claim 1, wherein generating the minimum partial password size for the authentication request is performed by the server computer, and further comprising:
   monitoring user-entered password characters received at the client computer;
   transmitting the minimum partial password size for the authentication request from the server computer to the client computer; and
   transmitting the set of user-entered password characters from the client computer to the server computer in response to determining that a total number of user-entered password characters received at the client computer is equal to the minimum partial password size.

3. The method of claim 2, wherein a memory on the server computer stores a plurality of partial passwords in association with the user identifier, wherein each one of the plurality of partial passwords has a length that is less than the length of the complete password associated with the user identifier, and further comprising:
   retrieving the partial password from the plurality of partial passwords stored on the server computer based on the user identifier and the minimum partial password size.

4. The method of claim 3, wherein the plurality of partial passwords stored on the server computer are encrypted based on an encryption key;
   wherein transmitting the set of user-entered password characters from the client computer to the server computer includes applying the encryption key to the set of user-entered password characters to generate an encrypted set of user-entered password characters; and
   wherein comparing the set of user-entered password characters to the partial password comprises comparing, by the server computer, the encrypted set of user-entered password characters to the encrypted partial password.

5. The method of claim 1, further comprising:
   generating, based on the risk score for the authentication request, a password similarity threshold for the authentication request, wherein relatively lower password similarity thresholds are generated for relatively lower risk scores;
   and wherein comparing the set of user-entered password characters to the partial password includes
      determining a level of similarity between the set of user-entered password characters and the partial password, and
      determining that the set of user-entered password characters match the partial password only in the event that the level of similarity between the set of user-entered password characters and the partial password is at least as high as the password similarity threshold for the authentication request.

6. The method of claim 5, wherein the password similarity threshold comprises a percentage of matching characters;
   wherein determining the level of similarity between the set of user-entered password characters and the partial password comprises determining a percentage of matching characters between the set of user-entered password characters and the partial password; and
   wherein the set of user-entered password characters are determined to match the partial password only in the event that the percentage of characters in the set of user-entered password characters that match corresponding characters in the partial password is at least as high as the password similarity threshold.

7. The method of claim 5, further comprising:
in response to the set of user-entered password characters not matching the partial password, receiving a new set of user-entered password characters, the new set of user-entered password characters having a length greater than the minimum partial password size and less than the length of the complete password associated with the user identifier;
retrieving, based on the user identifier and the length of the new set of user-entered characters, a second partial password from a plurality of partial passwords stored in association with the user identifier, the second partial password having a length equal to the length of the new set of user-entered password characters;
comparing the new set of user-entered password characters to the second partial password, including
determining a level of similarity between the new set of user-entered password characters and the second partial password, and
determining that the new set of user-entered password characters match the second partial password only in the event that the level of similarity between the new set of user-entered password characters and the second partial password is at least as high as the password similarity threshold.

8. The method of claim 5, wherein receiving the set of user-entered password characters includes receiving characters typed by the user into a password field in a form displayed by the client computer in a graphical user interface of the client computer, and wherein the minimum partial password size is generated on the server computer, and further comprising:
transmitting the minimum partial password size from the server computer to the client computer;
continuously monitoring, by the client computer, a total number of characters that have been entered by the user into the password field;
beginning transmission of characters that have been entered by the user into the password field, from the client computer to the server computer, in response to detecting that the total number of characters that have been entered by the user into the password field has reached the minimum password size;
continuing to transmit characters that have been entered by the user into the password field, from the client computer to the server computer, after the total number of characters that been entered by the user into the password field has exceeded the minimum password size; and
comparing increasingly large sets of characters that have been entered into the password field and received by the server computer from the client computer to a series of increasingly large partial passwords stored in the server computer.

9. The method of claim 8, wherein generating the risk score for the authentication request is responsive to known attack patterns stored in a known attack pattern database, and includes i) comparing the risk attributes to the known attack patterns stored in the known attack pattern database, and ii) generating a relatively higher risk score indicating a relatively higher risk of fraud in response to the risk attributes being similar to the known attack patterns stored in the known attack pattern database.

10. The method of claim 9, wherein the risk score for the authentication request comprises a probability value representing a probability that the user is an imposter; and
wherein generating the minimum partial password size for the authentication request includes generating a value of the minimum partial password size that is equal to the length of the complete password associated with the user identifier in response to the risk score being equal to a maximum probability value.

11. The method of claim 10, wherein the password similarity threshold comprises an edit distance; and
wherein determining the level of similarity between the set of user-entered password characters and the partial password includes determining an edit distance between the set of user-entered password characters and the partial password; and
wherein the set of user-entered password characters are determined to match the partial password only in the event that the edit distance between the set of user-entered password characters and the partial passwords is at least as small as the password similarity threshold.

12. The method of claim 1, wherein the message indicating that the user is authenticated causes the client computer to immediately stop inputting the user-entered password characters by redirecting an agent executing on the client computer to the requested secure resource.

13. The method of claim 1, wherein generating the risk score for the authentication request includes passing the risk attributes to a risk engine that generates the risk score, the risk engine executing on processing circuitry of the server computer; and
wherein generating the minimum partial password size for the authentication request includes passing the risk score from the risk engine to partial password logic that generates the minimum partial password size, the partial password logic executing on the processing circuitry of the server computer.

14. The method of claim 13, wherein the partial password logic includes a password database, wherein the password database stores a set of partial passwords in association with the user identifier; and
wherein comparing the set of user-entered password characters to the partial password stored in association with the user identifier includes retrieving the partial password from the set of partial passwords associated with the user identifier in the password database, based on the user identifier and the minimum partial password size.

15. A system for authenticating a user based on a partial password, comprising:
at least one processor;
a memory having program code stored thereon, wherein the program code, when executed by the processor, causes the processor to
receive, from a client computer, a user identifier and risk attributes associated with an authentication request;
generate a risk score for the authentication request based on the risk attributes and the user identifier, wherein relatively higher risk scores are generated for authentication requests associated with risk attributes indicating a higher risk of fraud;
generate, based on the risk score for the authentication request, a minimum partial password size for the authentication request, wherein the minimum partial password size is less than a length of a complete password associated with the user identifier, and wherein relatively smaller minimum partial password sizes are generated for relatively lower risk scores;

receive a set of user-entered password characters, wherein the set of user-entered password characters has a length equal to the minimum partial password size;
compare the set of user-entered password characters to a partial password stored in association with the user identifier, the partial password having a length equal to the minimum partial password size; and
generate and transmit, in response to the set of user-entered password characters matching the partial password, a message to the client computer, the message indicating that the user is completely authenticated and immediately granting the user full and complete access to a requested secure resource without receipt of the complete password associated with the user identifier, and wherein receipt of the message by the client computer causes the client computer to immediately stop inputting user entered password characters prior to the user entering the complete password.

16. The system of claim 15, wherein the program code, when executed by the processor, further causes the processor to:
transmit the minimum partial password size for the authentication request to the client computer;
wherein receipt of the minimum partial password size causes the client computer to transmit the set of user-entered password characters from the client computer to the server computer in response to determining that a total number of user-entered password characters received at the client computer is equal to the minimum partial password size.

17. The system of claim 16, wherein a memory on the server computer stores a plurality of partial passwords in association with the user identifier, wherein each one of the plurality of partial passwords has a length that is less than the length of the complete password associated with the user identifier, and wherein the program code, when executed by the processor, further causes the processor to:
retrieve the partial password from the plurality of partial passwords stored on the server computer based on the user identifier and the minimum partial password size.

18. The system of claim 17, wherein the plurality of partial passwords stored on the server computer are encrypted based on an encryption key;
wherein the client computer applies the encryption key to the set of user-entered passwords prior to transmitting the set of user-entered password characters from the client computer to the server computer; and
wherein the program code, when executed by the processor, causes the processor to compare the set of user-entered password characters to the partial password by comparing the encrypted set of user-entered password characters to the encrypted partial password.

19. The system of claim 15, wherein the program code, when executed by the processor, further causes the processor to:
generate, based on the risk score for the authentication request, a password similarity threshold for the authentication request, wherein relatively lower password similarity thresholds are generated for relatively lower risk scores; and
compare the set of user-entered password characters to the partial password by
determining a level of similarity between the set of user-entered password characters and the partial password, and
determining that the set of user-entered password characters match the partial password only in the event that the level of similarity between the set of user-entered password characters and the partial password is at least as high as the password similarity threshold for the authentication request.

20. The system of claim 19, wherein the password similarity threshold comprises a percentage of matching characters, and wherein the program code, when executed by the processor, further causes the processor to:
compare the set of user-entered password characters to the partial password by
determining the level of similarity between the set of user-entered password characters and the partial password by determining a percentage of matching characters between the set of user-entered password characters and the partial password; and
determining that the set of user-entered password characters match the partial password only in the event that the percentage of characters in the set of user-entered password characters that match corresponding characters in the partial password is at least as high as the password similarity threshold.

21. The system of claim 19, wherein the program code, when executed by the processor, further causes the processor to:
in response to the set of user-entered password characters not matching the partial password, receive a new set of user-entered password characters, the new set of user-entered password characters having a length greater than the minimum partial password size and less than the length of the complete password associated with the user identifier;
retrieve, based on the user identifier and the length of the new set of user-entered characters, a second partial password from a plurality of partial passwords stored in association with the user identifier, the second partial password having a length equal to the length of the new set of user-entered password characters;
compare the new set of user-entered password characters to the second partial password, by
determining a level of similarity between the new set of user-entered password characters and the second partial password, and
determining that the new set of user-entered password characters match the second partial password only in the event that the level of similarity between the new set of user-entered password characters and the second partial password is at least as high as the password similarity threshold.

22. The system of claim 15, wherein the message indicating that the user is authenticated causes the client computer to immediately stop inputting the user-entered password characters by redirecting an agent executing on the client computer to the requested secure resource.

23. A non-transitory computer readable medium for authenticating a user based on a partial password, comprising instructions stored thereon, that when executed on a processor, perform the steps of:
receiving, from a client computer, a user identifier and risk attributes associated with an authentication request;
generating a risk score for the authentication request based on the risk attributes and the user identifier, wherein relatively higher risk scores are generated for authentication requests associated with risk attributes indicating a higher risk of fraud;

generating, based on the risk score for the authentication request, a minimum partial password size for the authentication request, wherein the minimum partial password size is less than a length of a complete password associated with the user identifier, and wherein relatively smaller minimum partial password sizes are generated for relatively lower risk scores;

receiving a set of user-entered password characters, wherein the set of user-entered password characters has a length equal to the minimum partial password size;

comparing the set of user-entered password characters to a partial password stored in association with the user identifier, the partial password having a length equal to the minimum partial password size; and in response to the set of user-entered password characters matching the partial password, generating and transmitting a message, from the server computer to the client computer, the message indicating that the user is completely authenticated and immediately granting the user full and complete access to a requested secure resource without receipt by the server computer of the complete password associated with the user identifier, and wherein receipt of the message by the client computer causes the client to immediately stop inputting user entered password characters prior to the user entering the complete password.

* * * * *